(No Model.)

R. O. GERCKE.
CAR STARTER.

No. 348,732. Patented Sept. 7, 1886.

WITNESSES:
Chas. Nida
C. Sedgwick

INVENTOR:
R. O. Gercke
BY Munn & Co
ATTORNEYS.

UNITED STATES PATENT OFFICE.

RUDOLF OTTO GERCKE, OF AUGUSTA, GEORGIA.

CAR-STARTER.

SPECIFICATION forming part of Letters Patent No. 348,732, dated September 7, 1886.

Application filed April 26, 1886. Serial No. 200,137. (No model.)

*To all whom it may concern:*

Be it known that I, RUDOLF OTTO GERCKE, of Augusta, in the county of Richmond and State of Georgia, have invented a new and useful Improvement in Car-Starters, of which the following is a specification, reference being had to the annexed drawings, forming a part thereof, in which—

Figure 1:
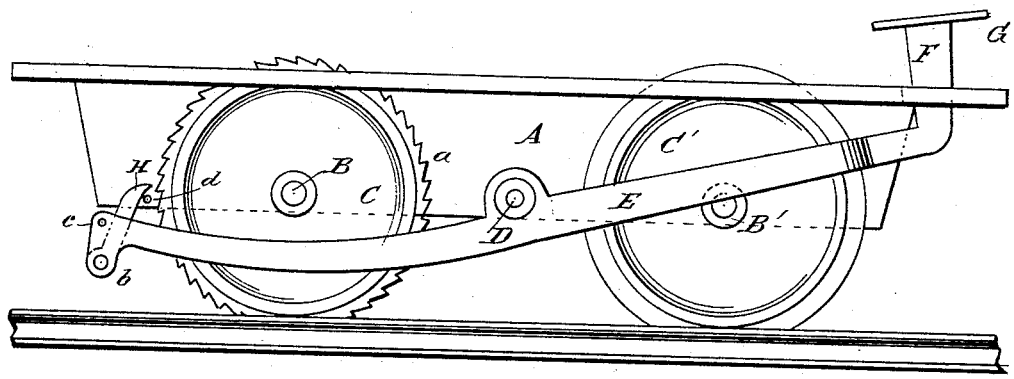
Figure 2:
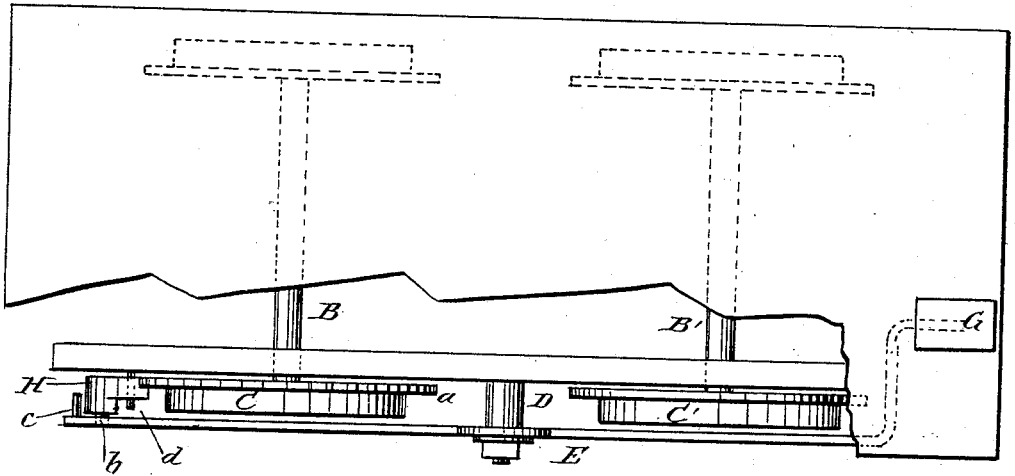

Figure 1 is a side elevation of a part of a car embodying my improvement. Fig. 2 is a plan view with a part broken away to more clearly show the construction.

Similar letters of reference indicate corresponding parts in both figures of the drawings.

The object of my invention is to provide a simple and efficient device by means of which the car-driver may assist the horses in starting the car.

My invention consists of a lever pivoted at or near its center to the car-truck, and carrying at one end a pawl and at the opposite end a foot-pedal within convenient reach of the car-driver, and a car-wheel having ratchet-teeth formed in its flange for receiving the pawl carried by the lever.

The car-truck A is mounted upon the axles B B' in the usual way, and to the axles B B' are secured the car-wheels C C'.

In the flange of the car-wheel C are formed ratchet-teeth $a$, and upon a stud, D, projecting from the car-truck, is pivoted a lever, E, which extends forward, and is bent laterally under the car-platform, and is provided with an arm, F, which extends upward through the car-platform and receives a pedal, G, which is within convenient reach of the car-driver. The opposite end of the lever E is widened, and on a stud, $b$, projecting from the inner face thereof, is placed a pawl, H, which is adapted to engage the ratchet-teeth $a$ in the flange of the wheel C. The lever E carries a stop-pin, $c$, which prevents the pawl H from being thrown over the center of the stud $b$, and a pin, $d$, projects from the side of the car-truck A, in the path of the pawl H. The end of the lever E, which carries the pawl H, overbalances the opposite end of the lever, so that by its own gravity it drops so as to bring the pawl H into engagement with the pin $d$, and thus remove the end of the pawl from the path of the teeth $a$.

When it is desired to bring the pawl into engagement with the ratchet-teeth $a$, the pressure of the driver's foot on the pedal G carries down that end of the lever, and raises the pawl end of the lever, bringing the pawl into engagement with the ratchet-teeth $a$ and exerting a pressure upon the periphery of the car-wheel C, which tends to propel the car-wheel forward and assist the horses in starting the car.

I am aware that a car-starter has been formed of a ratchet-wheel fixed on the axle and operated from a system of levers and pawls, and I do not claim the same as of my invention; but I am not aware that separate ratchet-wheels have been dispensed with and the flange of the wheel utilized as a ratchet by simply forming teeth in the periphery of said flange.

My improvement may be applied to wagons to enable the driver to assist the team over difficult places and to assist the team in starting.

Having thus described my invention, what I claim as new, and desire to secure by Letters Patent, is—

In a car-starter, the combination of the wheel having its flange toothed to form a ratchet with the lever E, pivoted between its ends, provided with the pedal G at one end, and the pawl H, pivoted to the opposite end, and pins at opposite sides of the pawl for holding it in proper position, substantially as set forth.

RUDOLF OTTO GERCKE.

Witnesses:
 WILLIAM F. LUPO,
 AUGUSTUS D. PICQUET.